J. Bogardus.
6903X Metallic Mill.
Patented Jan. 18, 1832.
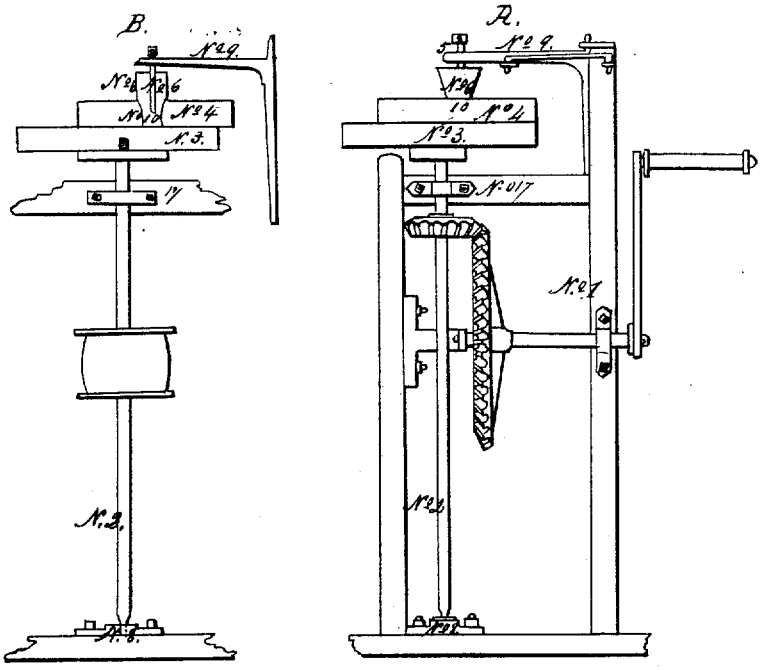
N. PETERS, PHOTO-LITHOGRAPHER, WASHINGTON, D. C.

6903x Jan 18, 1832

2231

* James Bogardus

Letters Patent (Patented Jan: 18. 1832)

The Schedule referred to in these Letters Patent, and making part of the same, containing a description in the words of the said James Bogardus himself of his improvement in the "universal mill" for Grinding Paints, Drugs, Dye Stuffs, Corn, Rye, Wheat, Barley, Oats, and various substances.

To all whom these Presents shall come

James Bogardus of the City, County, and State of New York, sends Greeting.

Be it known that I the said Bogardus have made and invented, constructed & applied to use, a new and useful improvement in Mills, called the "Universal Mill" from the variety of its motions and applications, for Grinding Paints, Drugs, Dye Stuffs, Corn, Rye, Wheat, Rice, Barley, Oats, and various other substances, and Specified in the following words, to wit.—

My invention or Improvement consists of a Frame, which for grinding Paint &c may be made similar to the one in the annexed drawing, marked No 1, drawing A and for grain or other substances similar in construction to Mills, built for those purposes with a Box made in a suitable manner, to catch the article ground as it is thrown from the stones in grinding, or in any other way that convenience or fancy may dictate.

No 2. The upright shaft to which the Stone is attached, and to which the power is to be applied either by means of a Wheel and pinion as shown in the drawing A, or a belt passing over the pulley on the shaft as shown in drawing B or such other method as is best adapted to the velocity required No 3 The shaft Stone, (or what is termed in common Mills "the bed Stone") is fastened firmly in a horizontal position to the top of the shaft

[illegible]

[illegible]

6903x Jan 18, 1832

No 3. and may be made to any convenient size, but for ordinary purposes it is recommended not to be over twenty inches diameter. In many instances metalic substances may be used in place of stone.

No 4. The top stone or what in common Mills is usually termed the "Runner" may also be made of the same material as the shaft stone, and is to be placed on the top of the same a little off the centre, the distance to be determined by the article to be ground, and the fineness required. It is recommended to be about one fifth less in diameter than the shaft stone; but may be varied without destroying the effect, and is secured by a screw or lever at No 5, running into a pivot hole in the bridge No 10, made for that purpose and placed firmly in the centre of No 4. The runner is driven by the motion of the shaft stone each revolving on its own axis, and by being placed off the centre gives it a peculiar motion which causes it to grind with great rapidity No 5. The screw, or lever, with a point passing through a slide to be placed in a crane or beam in a suitable manner for the purpose of shifting the Runner to or from the centre, of giving its pressure and keeping it in its proper place No 6. The Hopper which may be made in the same manner as those of Mills for the same purpose.

No 7. The bolster thro, which the shaft No 2 passes and holds it in its upright position. It should be placed near the under side of the shaft stone No 8 The step into which the lower point of the shaft No 2 runs No 9. The crane or beam thro which the screw passes down on the bridge No 10 to give the stone No 4 the desired pressure.

No 10. The bridge in which point No 5 is received. It should be made of Iron with the pivot hole of steel tempered in a suitable manner and fastned firm in stone No 4.

What I claim as my invention is the manner of placing the stone No 4 off the centre of the shaft stone No 3 which produces a combination of

6903x

Jan 18, 1832 of motions that I believe to be hitherto unknown and cannot be easily described

New York December 7th 1831

James Bogardus

Witnesses
Chas McKeon
N. Griffing
Exd 1796.

710 wds